United States Patent [19]

Mori et al.

[11] Patent Number: 4,547,874

[45] Date of Patent: Oct. 15, 1985

[54] MOVING COIL TYPE CARTRIDGE MOUNTED ON CANTILEVER WITHIN CENTRAL OPENING OF RING MAGNET

[75] Inventors: Yoshihisa Mori; Mitsuru Takashima, both of Tokyo, Japan

[73] Assignee: Sony Corporation, Tokyo, Japan

[21] Appl. No.: 413,082

[22] Filed: Aug. 30, 1982

[30] Foreign Application Priority Data

Sep. 10, 1981 [JP] Japan ........ 56-142838

[51] Int. Cl.$^4$ ........ H04R 9/12; H04R 9/16

[52] U.S. Cl. ........ 369/139; 369/147

[58] Field of Search ........ 369/147, 136, 139

[56] References Cited

U.S. PATENT DOCUMENTS

| | | | |
|---|---|---|---|
| 3,627,931 | 12/1971 | Matsuda | 369/136 |
| 3,956,598 | 5/1976 | Kawakami et al. | 369/147 |
| 4,090,039 | 5/1978 | Mori et al. | 369/147 |
| 4,161,631 | 7/1979 | Matsuda | 369/147 |
| 4,237,349 | 12/1980 | Hansen et al. | 369/147 |

FOREIGN PATENT DOCUMENTS

| | | | |
|---|---|---|---|
| 40-10187 | 5/1965 | Japan | 369/136 |

*Primary Examiner*—Robert L. Richardson

*Attorney, Agent, or Firm*—Lewis H. Eslinger; Alvin Sinderbrand

[57] ABSTRACT

Herein disclosed is a compact, highly reliable and inexpensive moving coil type cartridge comprising a ring-like magnet which is coaxially disposed with respect to a cantilever having a needle at its free end. A back-up first and a ring-like second auxiliary magnetic members are additionally provided at both sides of the ring magnet to attain the effective utilization of magnetic flux from the ring magnet.

16 Claims, 10 Drawing Figures

MOVING COIL TYPE CARTRIDGE MOUNTED ON CANTILEVER WITHIN CENTRAL OPENING OF RING MAGNET

BACKGROUND OF THE INVENTION

1. Field of the invention

This invention relates to a moving coil type (MC type) cartridge.

2. Description of the prior art

FIG. 1 shows a structure of a conventional moving coil type cartridge in which a magnetic circuit is formed by a magnet 1, yokes 2 and 3 and an air gap 4 disposed between the yokes 2 and 3. In addition, a cantilever 7 to which a needle or stylus 5 is attached with a given angle at one end and an armature coil 6 is integrally disposed at the other end is movably mounted to the yoke 3 by means of a tension wire 8 with its other end utilized as a fulcrum of movement. With the aforesaid coil 6 vibrated or rotated within the magnetic field of the air gap 4, a some amount of voltage will be induced in the coil 6 since the coil 6 cuts the magnetic flux. In short, in such a conventional system as this, a transducing system which is proportional to the moving speed of the armature is adopted.

However, in such a conventional moving coil type cartridge as mentioned above, a relatively large number of cartridge parts are required to lead the magnetic flux from the S or N pole of the magnet 1 through the yokes 2 and 3, thus making the cartridge itself bulky. In addition, the yokes 2 and 3 used for forming the magnetic circuit must be machined as precisely as possible, so that it is inevitable that the manufacturing cost of the cartridge becomes expensive.

SUMMARY OF THE INVENTION

It is therefore a primary object of the present invention to provide a small and inexpensive moving coil type cartridge having excellent properties in spite of extremely simple structure which is attained by adopting a ring-like magnet coaxially disposed with respect to a cantilever.

Another object of the present invention is to provide a moving coil type cartridge in which the flux provided by the ring magnet is more effectively used.

Still another object of the present invention is to provide a structure of moving coil type cartridge which attains effective utilization of the magnetic flux component extending toward the center of the ring-like magnet.

According to the present invention, those and other objects are achieved by a moving coil type cartridge comprising a cantilever for a needle or stylus, a coil assembly mounted on the cantilever for movement in response to movement of the cantilever by the stylus and a field assembly for providing magnetic flux to the coil assembly. The field assembly comprises a ring-like magnet that has its poles spaced axially along the magnet. The cantilever is disposed substantially along the axis of the magnet and extends from one axial side of the magnet. Cantilever movement is about a fulcrum within the center hollow portion of the ring-like magnet. The coil assembly is disposed on the cantilever for inducing a voltage by traversing a magnetic flux component extending substantially perpendicular to the magnet axis when the cantilever moves about the fulcrum.

BRIEF DESCRIPTION OF THE DRAWINGS

The novel features of the subject invention, as well as the invention itself, and the objects and advantages thereof will be better understood from the following description taken in conjunction with the accompanying drawings in which.

DESCRIPTION OF THE PREFERRED EMBODIMENT

Figure 1:
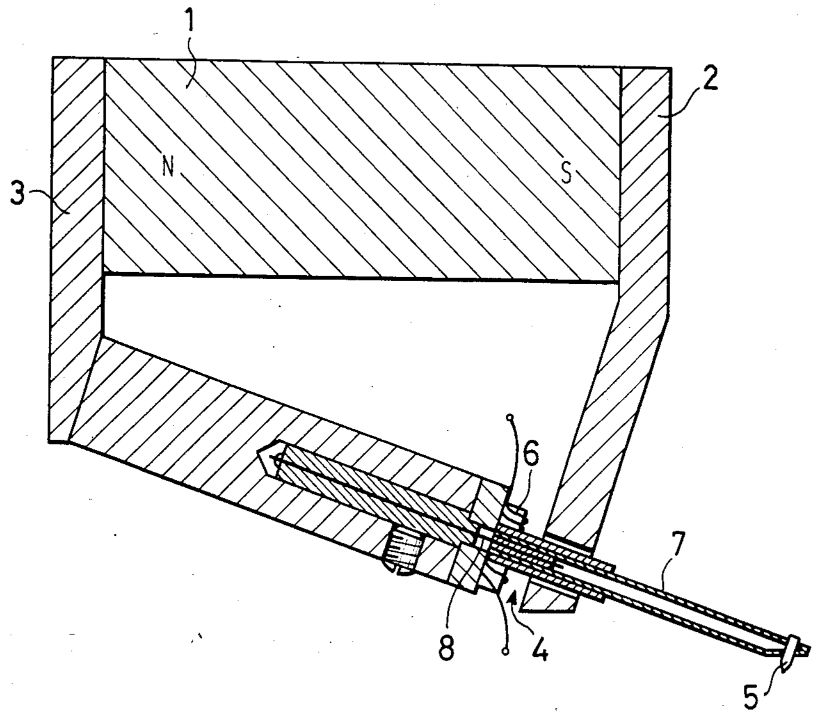
FIG. 1 PRIOR ART
FIG. 1 is a sectional view illustrating a typical structure of a conventional moving coil type cartridge.
Figure 2:
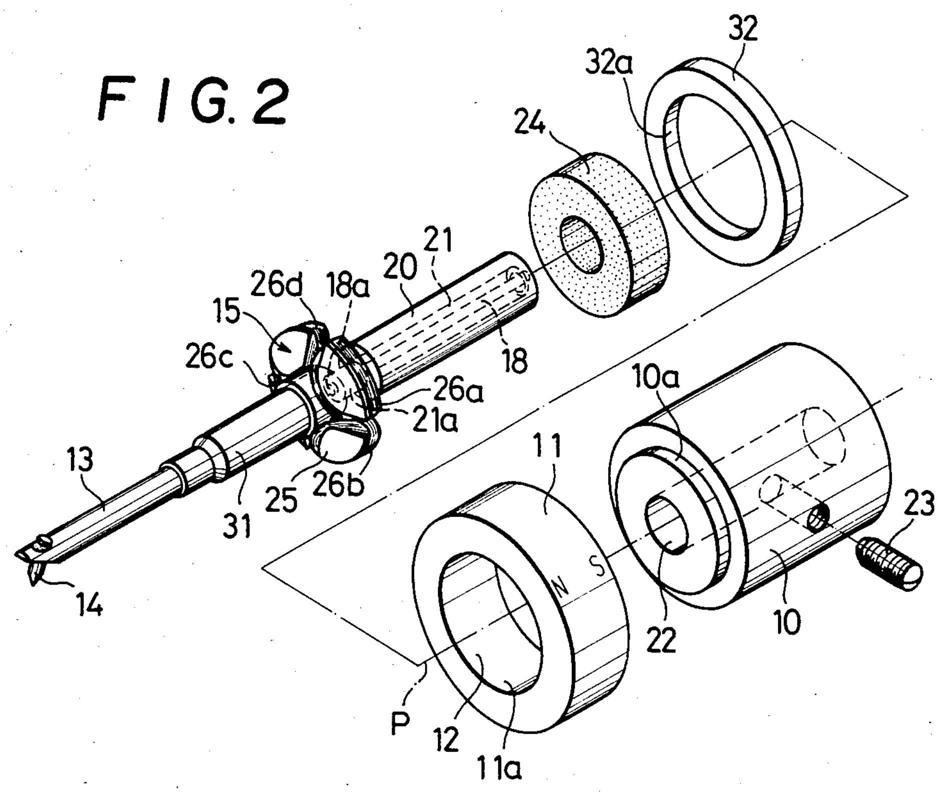
FIG. 2 is a exploded perspective view of a moving coil type cartridge in accordance with the present invention.

Referring now to FIG. 2 illustrating a preferred embodiment of the subject invention, the cartridge has a cylindrical magnetic member 10 of high permeability made of "soft magnetic material" such as pure iron or permalloy and the like, for example. A ring-like magnet 11 is adhered to one side or end of the magnetic member 10. The member 10 thus comprises a back-up auxiliary magnetic member disposed at an axial side of the ring-like magnet 11. The ring magnet 11 is provided with S and N poles along its axial direction. A ring-shaped convex portion 10*a* integrally formed at one side of the magnetic member 10 is neatly fitted without play into a central opening or hollow portion 12 of the magnet 11. Consequently, these two members are coaxially disposed to each other.

A cantilever is provided along the central axial line of the magnet 11. A needle or stylus 14 is attached at a given angle by means of an epoxy adhesive and the like at the far end of the cantilever, and an armature 15 is coaxially secured at the one end thereof. The cantilever 13 is so constructed that it can freely move in every direction with one end as a fulcrum of movement. As clearly indicated in FIGS. 2 and 4, the cantilever 13 is a hollow tube and a cantilever sleeve 17 is force-fitted into a hollow portion 16 at its one end. Disposed within the sleeve 17 is one end of a tension wire 18 such as a piano wire or the like whose extreme end is secured to the sleeve 17 by use of an epoxy adhesive, for example. The latter half of the tension wire 18 is inserted within a mounting sleeve 21 which is force-fitted into a tube-like member or mounting tube 20 made of brass. The other end of the tension wire 18 is fixed to the sleeve 21 at the other end of the back-up member 10 by use of an epoxy adhesive for example. A projected portion 21*a* of the sleeve 21 protrudes out of one end of the tube-like member 20 and is pinched. Therefore, the wire 18 is fixed at three points, that is, at the two ends thereof and the point corresponding to the aforesaid pinched portion. The length "1" of the wire fulcrum portion 18*a* between the top of projected portion 21*a* and the armature 15 is in the order of 0.2 mm.

Figure 4:
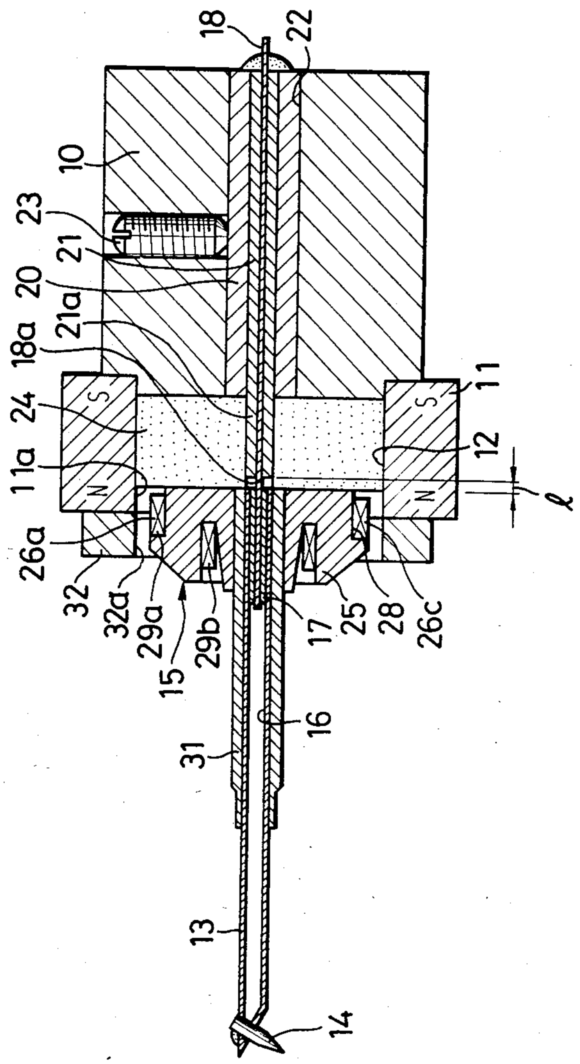
FIG. 4 is a sectional view taken along the line IV—IV in FIG. 3.

As clearly indicated in FIG. 4, the tube-like member 20 is tightened by means of a set screw 23 in such a manner that it is arranged within a central axial hole 22 of the magnetic back-up member 10. Under such circumstances, it will be seen that the armature 15 is coaxially arranged with respect to the magnetic member 10 and the ring magnet 11, and is located near one end of the magnet 11 opposite to the magnetic member 10 and disposed so as to correspond to a corner part 11*a* at the inner cylindrical surface of the magnet 11. A rubber damper 24 is interposed within the hollow portion 12 of the magnet 11 and between the armature 15 and the convex portion 10*a* of the one end of the magnetic member 10. Thus, the cantilever 13 and the armature 15 are supported so as to be freely movable in every direcion by utilization of the elasticity of the wire fulcrum portion 18*a* which is used as a fulcrum of movement.

Figure 6:
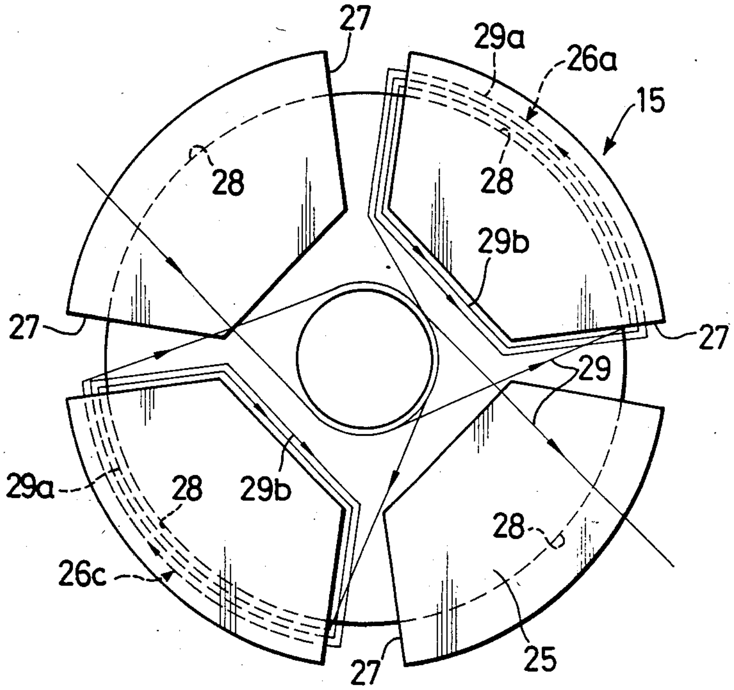
FIG. 6 is an enlarged plan view of an armature illustrating the direction of winding of the coils.

The armature 15 is made of hard resin such as polycarbonate and the like and comprises a coil bobbin 25 coaxially attached to the one end of the cantilever 13, and coils 26*a*–26*d* wound in the coil bobbin 25. As indicated in FIGS. 4 and 6, grooves 27 are formed for coil windings at one end plane of the coil bobbin 25, and at the peripheral surface of the other side, a step portion 28 for coil windings is also formed. An electrically conductive wire 29 constituting the coils 26 is orderly wound in the circumferential direction indicated by arrows in FIG. 6 and the left channel coils 26*a* and 26*c* which are opposite to each other are wound in the form of a FIG. 8 or "numeral 8". Although it is indicated in FIG. 6 that the wire 29 is wound only three times, more turns will be required to obtain the necessary sensitivity. In FIG. 6, the right channel coils 26*b* and 26*d* are not indicated, but they will be wound in the coil bobbin 25, just similarly to the coils 26*a* and 26*c*.

As shown in FIGS. 2 and 4, an aluminum pipe 31 is forceably fitted at the one end portion of the cantilever 13. The armature 15 is coaxially and tightly fitted to the pipe 31. The aluminum pipe 31 is interposed between the armature 15 and the one end portion of the cantilever 13 to cause the end of the cantilever or part near the root to have a damping effect.

Figure 3:
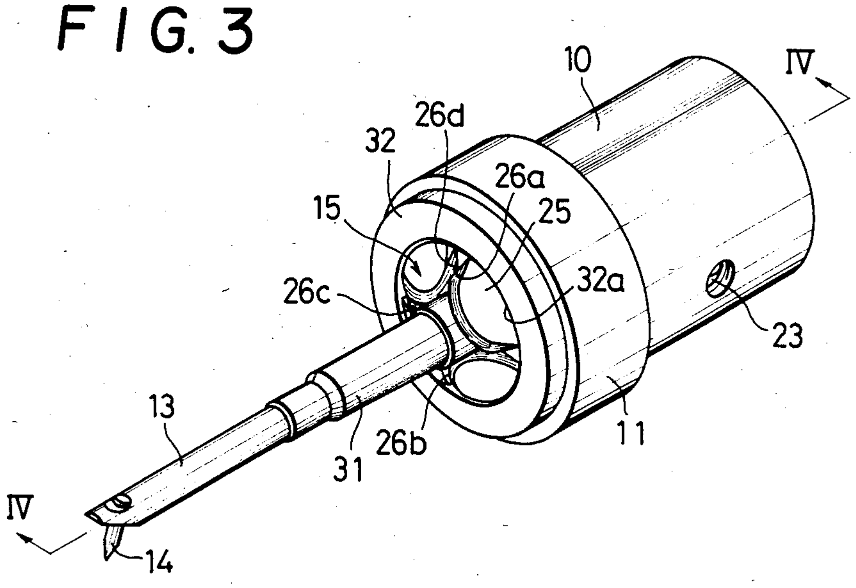
FIG. 3 is a perspective view of the cartridge of FIG. 2 after assembling.
Figure 5:
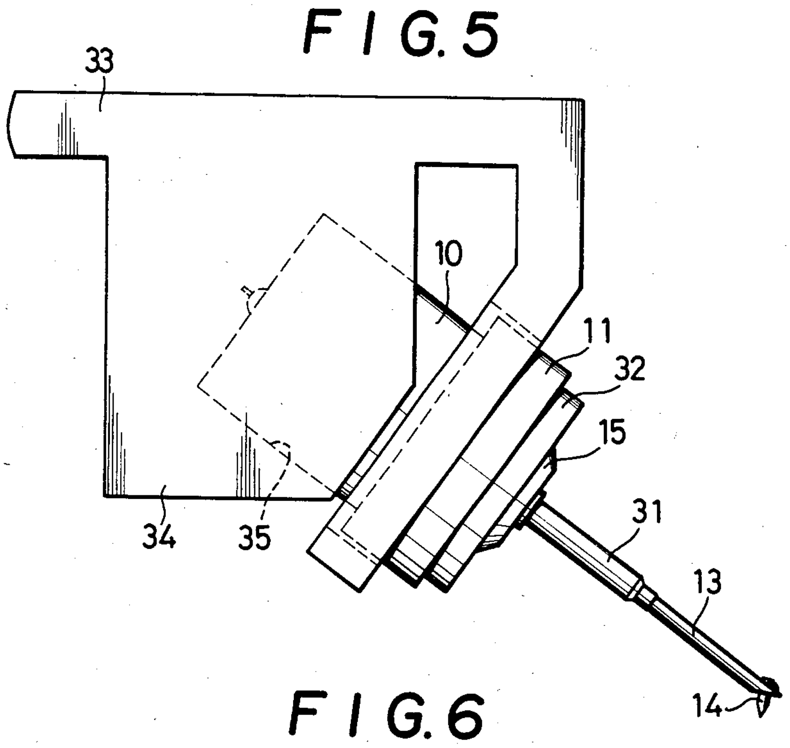
FIG. 5 is a side view illustrating the mounting of the cartridge to a housing.

In addition, a ring-shaped or ring-like auxiliary magnetic member 32 of pure iron or permalloy having high permeability is coaxially attached at one axial side of the magnet 11 at the end plane of its corner part 11*a*. The magnetic member 32 is made of a circular flat plate and provided with an opening 32*a* whose inside diameter corresponds to the center hollow portion 12 of the magnet 11. And the inner peripheral surface of the opening 32*a* is nearly aligned with the inner peripheral surface of the magnet 11 along the direction of axial line. As indicated in FIGS. 3–5, the coils 26*a*–26*d* of the armature 15 are arranged in a hollow portion formed by the inner peripheral surface adjacent to the corner part 11*a* of the magnet 11 and the peripheral surface in the opening 32*a* of the magnetic member 32. Thus, a pair of outer wire segments 29*a* wound at the peripheral surface of the coil bobbin 25, which are part of the wire 29 constituting the paired coils 26*a* and 26*c*, are positioned proximate to or in the vicinity of the junction of the inner peripheral surfaces of the magnetic member 32 and the magnet 11 at the corner part 11*a* of the magnet 11. And another pair of inner wire segments 29*b* wound at the central side of the coil bobbin 25 are positioned adjacent to the center P of the hollow portion 12 of the magnet 11.

The cartridge sub-assembly as shown in FIG. 3 is further assembled, as shown in FIG. 5, by inserting part of the magnetic member 10 into a hole 35 formed in a body 34 of a housing 33 made of hard resin and applying an appropriate adhesive thereto. Thus, the cantilever 13 and the needle 14 fixedly attached thereto are thereby arranged at the desired angle with respect to the horizontal direction.

Figure 7:
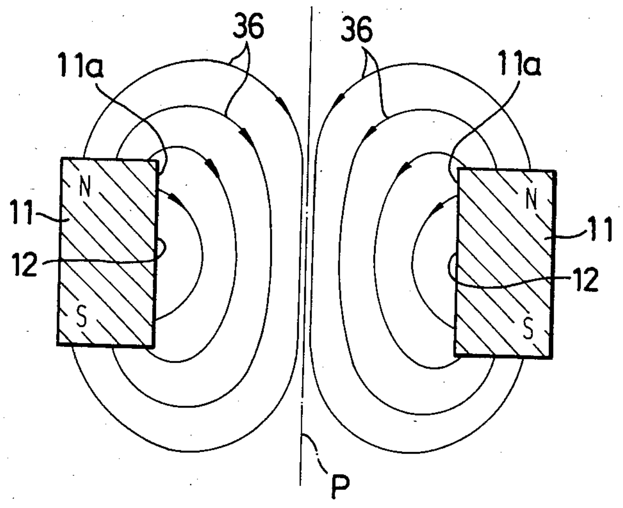
FIG. 7 is a sectional view illustrating the distribution of magnetic fluxes in the hollow portion of the ring magnet.
Figure 8:
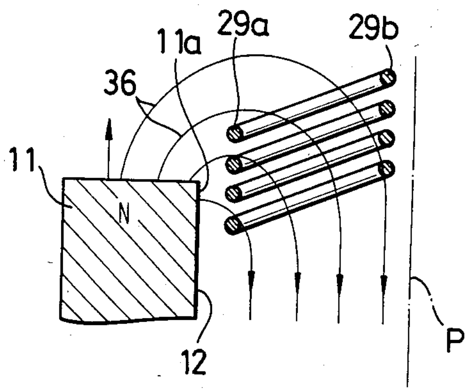
FIG. 8 is a partially broken, enlarged sectional view showing the relationship between a coil and the magnetic flux emerging from the ring magnet.

In this paragraph, operation of such cartridge as constructed above will be explained in detail. The magnetic field or flux in the hollow portion 12 of the magnet 11 provided thereby are shown in FIG. 7. The magnetic flux emerging from the N pole and expanding into space have a tendency to converge in the vicinity of the first axial side or the corner part 11*a* and the inner peripheral surface of the ring magnet 11. The direction of the magnetic flux components in the vicinity of the corner part 11*a* is substantially radial: i.e., perpendicular to the center line P or axis of the hollow portion 12. Since the magnet 11 is in the shape of a ring, the direction of the magnetic flux in the vicinity of the center line P is nearly parallel to the center line P. As already described, since the coils 26*a*–26*d* of the coil assembly are arranged in the vicinity of the corner part 11*a* of the magnet 11, the magnetic flux components substantially perpendicular to the magnet axis are traversed by the outer pair of wire segments 29*a* when the cantilever moves about the fulcrum, as schematically indicated in FIG. 8. For this reason, if the coils 26*a*–26*d* are moved in response to the operation of the needle 14 with the wire portion 18*a* as a fulcrum of movement, a voltage corresponding to its moving speed will be induced in the pair of wire segments 29*a*. Whereas, no voltage will be induced in the inner pair of wire segments 29*b* because, upon the wire segments 29*b* disposed in the vicinity of the center line P, only the magnetic flux in the vertical direction will act. Accordingly, it will be understood that electric power generation will be made by a cooperation of the wire segments 29*a* and the magnetic flux component substantially perpendicular to the center line P.

Since the coil pairs 26*a*, 26*c* and 26*b*, 26*d* are wound in the form of a "numeral 8" as described before, the pair of wire segments 29*a* of the coil in the form of "8" differentially cut the magnetic flux components in proportion to the motion of the needle 14, and thus in turn, the armature 15. Their electromotive forces are therefore mutually additively generated in series manner in the windings. If the needle 14 moves, one portion of the armature 15 will be pushed in one axial direction and another opposite portion of the armature will be pulled in the opposite direction, so that currents are generated in the opposite direction by pushed one of the pair of outer wire segments 29*a* of the coil and by pulled another opposite wire segment 29*a*. However, since the coil is wound in the form of a figure "8", the currents generated in the opposite direction are added through the whole wire 29 of the coil. As the result, the amount of the electric power generation in each segment moving in that push-pull way will be summed to form a doubled output. Accordingly, a large output voltage can be obtained.

Figure 9:
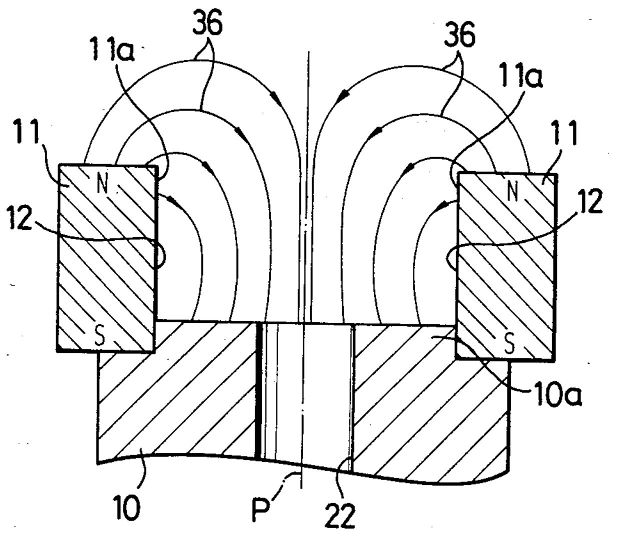
FIG. 9 is a sectional view illustrating the magnetic fluxes when a first back-up auxiliary magnetic member of high permeability is disposed at axial end of the ring magnet.

In addition, since there is disposed the back-up magnetic member 10 of high permeability at the end other axial side or portion of the ring magnet 11, that is, at the opposite side with respect to the side where the coils 26*a*–26*d* are disposed, and the convex portion 10*a* of which is fitted into a part of the hollow portion 12 of the ring magnet 11, the magnetic path 36 for the fluxes within the hollow portion 12 becomes shorter as illustrated in FIG. 9. As a result, the magnetic flux that may not enter the hollow portion 12 of the ring magnet 11 when the magnetic member 10 is not provided can enter the hollow portion 12 to enhance the concentration of magnetic fluxes, thereby increasing the magnetic flux density or the magnetic field strength therein. Accordingly, due to the presence of the magnetic member 10, the efficiency of electric power generation by means of the magnet 11 and the coils 26*a*–26*d* can be greatly improved. Besides, since the magnetic member 10 and the ring magnet 11 are fitted to each other, the moving part of cartridge comprising the cantilever 13, the armature 15, the rubber damper 24 and the like can be surely held without play.

Figure 10:
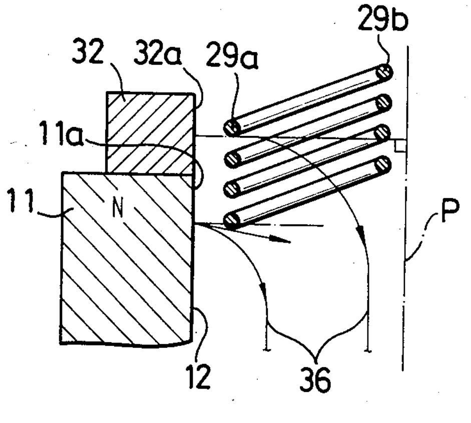
FIG. 10 is a sectional view when a second auxiliary magnetic member of high permeability is disposed at the other ring-like end of the ring magnet.

In addition, since there is provided the ring-like magnetic member 32 of high permeability at the first axial side or end plane of the ring magnet or at the side where the coils 26*a*–26*d* are disposed, it becomes possible to permit the perpendicular component of the magnetic flux to effectively act upon the wire segments 29*a* of the coils 26*a*–26*d*. As indicated in FIG. 10, although the direction of magnetic flux emerging from the inner peripheral surface of the ring magnet 11 slightly inclines against the direction perpendicular to the aforesaid inner peripheral surface, the magnetic flux emerging from the peripheral surface in the opening 32*a* of the magnetic member made of "soft magnetic material" having extremely high permeability will be normal to its peripheral surface. Therefore, to the wire segments 29*a* of the coils 26*a*–26*d* located in the vicinity of the magnetic member 32, the magnetic flux component in the horizontal direction perpendicular to center line P will be enhanced. As a result, as compared with the case where the magnetic member 32 is not provided, the perpendicular component of the magnetic fluxes acting on the wire material portion 29*a* is effectively increased, thus leading to the improvement of the efficiency of electric power generation.

According to the present invention, a moving coil type cartridge uses as a field magnet the ring magnet 11 in which the S and N poles are spaced along the axis of the magnet. The ring magnet 11 is provided with the magnetic members 10 and 32 of high permeability at both ends of the magnet 11. And the wire 29 of the coil pairs 26*a*, 26*c* and 26*b*, 26*d* are wound in the form of a numeral "8" to effectively utilize the magnetic flux density as well as the direction of magnetic flux proximate to the juncture of the inner peripheral surfaces of the member 32 and of the ring magnet 11 in order to induce high voltages.An inexpensive cartridge with higher performances can be obtained in spite of very simple construction, and at the same time, the productivity of the cartridges can be greatly improved. Besides, a drastic miniaturization of the cartridge can be attained since no yoke member such as that used in a conventional cartridge is used to constitute a magnetic circuit.

While there has been described and illustrated what is at present considered to be the preferred embodiment of the present invention, it will be appreciated that numerous changes and modifications are likely to occur to those skilled in the art without departing from the spirit and scope of the invention.

For example, although there is utilized a ring-shaped magnet such as the magnet 11 in the illustrated embodiment, a square tube-like magnet which is square in section can also be used as well.

It is intended that the scope of the present invention be defined solely by the appended claims.

What we claim is:

1. A moving coil type cartridge comprisng a cantilever for a stylus, a coil assembly which includes a plurality of wire turns and is mounted on said cantilever for movement in response to movement of said cantilever by the stylus, and a field assembly for providing magnetic flux to said coil assembly;
   - said field assembly comprising a ring-like magnet defining a central opening and having magnetic poles lying in substantially parallel planes spaced along the axis thereof;
   - said cantilever being disposed substantially along said axis of said magnet and extending from one axial side thereof, said movement of said cantilever being about a fulcrum within said central opening and adjacent to at least one of said pole planes; and
   - said coil assembly being disposed on said cantilever within said central opening substantially in said one of said planes so that at least a portion of said wire turns induces a voltage by effecting a traverse of lines of a magnetic flux component upon movement of said cantilever about said fulcrum, the directions of (a) said traverse, (b) the turns of said portion, and (c) said lines of magnetic flux component, each considered with respect to the axis of said magnet, being substantially axial, circumferential, and radial, respectively.

2. A moving coil type cartridge according to claim 1; further comprising a back-up auxiliary magnetic member of high permeability disposed at the other axial side of said ring-like magnet and wherein said back-up auxiliary magnet member blocks at least a part of said central opening at said other axial side.

3. A moving coil type cartridge according to claim 1; further comprising a ring-like auxiliary magnetic member of high permeability disposed at said one axial side of said ring-like magnet and having an inside diameter substantially the same as said central opening.

4. A moving coil type cartridge according to claim 3; wherein said coil assembly is disposed proximate to the juncture of the inner peripheral surfaces of the first-mentioned ring-like magnet and of said ring-like auxiliary magnetic member.

5. A moving coil type cartridge according to claim 2; wherein said cantilever terminates at one end at said fulcrum, said back-up auxiliary magnetic member is cylindrical, and said one
   - end of said cantilever is supported by a tension wire passing axially through said back-up auxiliary magnetic member.

6. A moving coil type cartridge according to claim 5; further comprising a rubber damper within said central opening between said coil assembly and one end of said back-up auxiliary magnetic member.

7. A moving coil type cartridge according to claim 6; wherein said cantilever includes a hollow tube and a cantilever sleeve secured within said one end thereof and one end of said tension wire is secured to said cantilever sleeve.

8. A moving coil type cartridge according to claim 7; further comprising a mounting sleeve secured within a mounting tube held in said back-up auxiliary magnetic member by a set screw and having said tension wire extending axially through said mounting sleeve, and wherein the other end of said tension wire is secured to said mounting sleeve at the other end of said back-up magnetic member.

9. A moving coil type cartridge according to claim 8; wherein said mounting sleeve extends through a central, axial hole in said rubber damper and terminates near said one end of said cantilever.

10. A moving coil type cartridge according to claim 9; wherein said mounting sleeve terminates about 0.2 mm from said one end of said cantilever for providing a fulcrum portion of said tension wire between said mounting sleeve and said cantilever, said fulcrum portion comprising said fulcrum for supporting said cantilever and said coil assembly for universal movement by using the elasticity of said fulcrum portion.

11. A moving coil type cartridge according to claim 1; wherein said coil assembly comprises a coil bobbin and a pair of left and right channel coils wound on said coil bobbin.

12. A moving coil type cartridge according to claim 11; wherein each of said left and right channel coils consists of a pair of coil portions wound in a "figure 8".

13. A moving coil type cartridge according to claim 12; further comprising a ring-like auxiliary magnetic member of high permeability disposed at said one axial side of the first-mentioned ring-like magnet and having an inside diameter substantially the same as said central opening, wherein said pair of coil portions wound in a "figure 8" have a pair of outer wire segments wound at the outer peripheral surface of said coil bobbin and said wire segments are disposed proximate to the juncture of the inner peripheral surfaces of said ring-like auxiliary magnet member as well as the corner part and said first ring-like magnet.

14. A moving coil type cartridge according to claim 13; wherein said outer pair of coil segments are disposed for traversing the magnetic flux component extending substantially perpendicular to said magnet axis upon movement of said cantilever about said fulcrum, whereby the voltages induced in said outer pair of coil portions are mutually additive in series in said "figure 8" winding.

15. A moving coil type cartridge according to claim 1; wherein said cantilever terminates at one end at said fulcrum and said cartridge further comprises an aluminum pipe secured over said one end of said cantilever, said coil assembly being secured coaxially to said pipe, whereby said pipe has a damping effect on said cantilever movement.

16. A moving coil type cartridge according to claim 2; further comprising a second auxiliary magnetic member of high permeability which is ring-like and disposed at said one axial side of said ring-like magnet and which has an inside diameter substantially the same as said central opening, wherein said back-up and second auxiliary magnetic members are of a soft magnetic material selected from the group consisting of pure iron and permalloy.

* * * * *